United States Patent
Calo et al.

(10) Patent No.: US 9,705,749 B2
(45) Date of Patent: *Jul. 11, 2017

(54) EXECUTING DATA STREAM PROCESSING APPLICATIONS IN DYNAMIC NETWORK ENVIRONMENTS

(71) Applicant: International Business Machines Corporation, Armonk, NY (US)

(72) Inventors: Seraphin B. Calo, Cortlandt Manor, NY (US); Abm Musa, Chicago, IL (US); Theodoros Salonidis, Yorktown Heights, NY (US); Murtaza Zafer, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 14/585,241

(22) Filed: Dec. 30, 2014

(65) Prior Publication Data

US 2016/0234070 A1 Aug. 11, 2016

Related U.S. Application Data

(60) Provisional application No. 62/047,204, filed on Sep. 8, 2014.

(51) Int. Cl.
*H04L 12/24* (2006.01)
*H04L 12/721* (2013.01)
(Continued)

(52) U.S. Cl.
CPC .............. *H04L 41/12* (2013.01); *H04L 45/44* (2013.01); *H04L 45/48* (2013.01);
(Continued)

(58) Field of Classification Search
CPC ..... H04L 41/12; H04L 43/0817; H04L 45/02; H04L 45/48; H04L 45/44; H04L 45/38
(Continued)

(56) References Cited

U.S. PATENT DOCUMENTS

| 8,878,852 B1* | 11/2014 | Klein | ................. H04L 43/0811 |
| | | | 345/440 |
| 9,258,195 B1* | 2/2016 | Pendleton | ............... H04L 41/12 |

(Continued)

*Primary Examiner* — Brian J Gillis
*Assistant Examiner* — Steve Lin
(74) *Attorney, Agent, or Firm* — Cantor Colburn LLP

(57) ABSTRACT

In one embodiment, a computer-implemented method includes receiving a network graph describing a network having two or more nodes. An application graph is received describing a data stream application. The application graph includes one or more vertices, each corresponding to an operator of the application and associated with a list of nodes. A first vertex of the application graph corresponds to a first operator and is associated with two or more nodes. The application graph is augmented, which includes replicating the first operator such that the augmented graph includes a copy of the first operator at each of the nodes associated with the first vertex. The application is deployed over the network based on the augmented graph, such that a copy of the first operator is deployed at each of the nodes associated with the first vertex. A route through the augmented graph is selected for a data stream.

13 Claims, 12 Drawing Sheets

(51) Int. Cl.
*H04L 12/753* (2013.01)
*H04L 12/26* (2006.01)
*H04L 12/751* (2013.01)

(52) U.S. Cl.
CPC .......... *H04L 43/0817* (2013.01); *H04L 45/02* (2013.01); *H04L 45/38* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 2008/0222287 A1* | 9/2008 | Bahl | ................... | H04L 41/5058 709/224 |
| 2011/0002240 A1* | 1/2011 | Harel | ...................... | H04L 45/02 370/254 |
| 2011/0067030 A1* | 3/2011 | Isard | ...................... | G06F 8/433 718/102 |
| 2015/0207671 A1* | 7/2015 | Farkas | .................... | H04L 45/48 370/228 |
| 2015/0264135 A1* | 9/2015 | Kandula | ............. | H04L 67/1095 709/204 |
| 2015/0372873 A1* | 12/2015 | Mahadevan | ............ | H04L 41/12 370/255 |

* cited by examiner

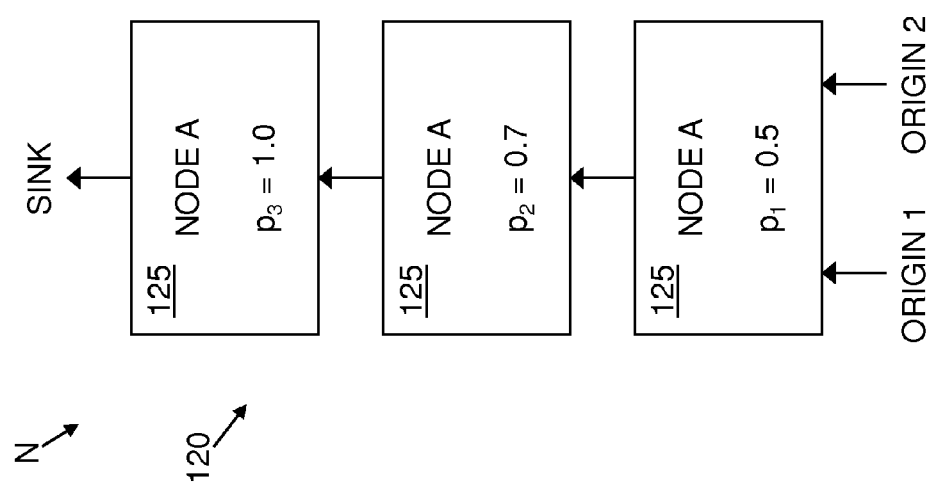

EXECUTING DATA STREAM PROCESSING APPLICATIONS IN DYNAMIC NETWORK ENVIRONMENTS

STATEMENT OF GOVERNMENT INTEREST

This invention was made with Government support under Contract No. W911NF-10-1-0324 awarded by the Army Research Office (ARO). The Government has certain rights in this invention.

DOMESTIC PRIORITY

This application is a non-provisional of U.S. Provisional Patent Application Ser. No. 62/047,204 filed Sep. 8, 2014, the disclosure of which is incorporated by reference herein in its entirety.

BACKGROUND

Various embodiments of this disclosure relate to data stream processing and, more particularly, to executing data stream processing applications in dynamic network environments.

A data stream includes a continuous sequence of numerous data units. Data stream applications are applications that can be applied to data streams to process those data units. Data stream processing systems apply data steam applications to data streams and are used in a wide area of fields in which processing is required, such as finance, social network applications, smart cities applications, sensor network applications, and telecommunications.

Data stream processing systems can be expressed as application graphs that receive as input one or more original data streams and output one or more multiple sink data streams. The vertices of each graph correspond to operators of a data stream application, where each operator performs a function on a data stream being processed.

Existing data stream processing systems operate inside datacenters where all incoming data streams are processed by stream applications deployed in the fixed datacenter cluster. Typically, a stream application is first deployed in a datacenter cluster by mapping the operators of the stream application graph to the datacenter's computation resources. Because a data center is a centralized environment, it is possible to perform such mappings efficiently using existing sophisticated deployment stream optimization approaches. After deployment, the stream application executes in the datacenter by processing incoming original data streams and outputting sink data streams.

Both deployment and runtime stream optimization mechanisms in datacenter clusters typically use centralized control and implicitly or explicitly assume a homogeneous processing and communication environment.

SUMMARY

In one embodiment of this disclosure, a computer-implemented method includes receiving data representable by a network graph describing a network having two or more nodes. Data may be received representable by an application graph describing a data stream application. The application graph includes one or more vertices, each corresponding to an operator of the data stream application, and each being associated with a list of nodes at which the corresponding operator is deployable. A first vertex of the application graph corresponds to a first operator and is associated with two or more of the nodes, and is connected to one or more other vertices corresponding to one or more other operators. The application graph is augmented, by a computer processor, to generate an augmented graph. The augmenting includes replicating the first operator, such that the augmented graph includes a copy of the first operator at each of the two or more nodes associated with the first vertex, and such that the augmented graph includes one or more copies of each of the one or more vertices corresponding to operators. In the augmented graph, each copy of the first operator is interconnected with one or more copies of the one or more other operators. The data stream application is deployed over the network based on the augmented graph, such that a copy of the first operator is deployed at each of the two or more nodes associated with the first vertex. A route for a data stream through the augmented graph is selected, where the data stream application is configured to process a plurality of data units of the data stream by using the operators along the selected route.

In another embodiment, a system includes a memory and one or more processors communicatively coupled to the memory. The one or more processors are configured to receive data representable by a network graph describing a network having two or more nodes. The one or more processors are further configured to receive data representable by an application graph describing a data stream application. The application graph includes one or more vertices, each corresponding to an operator of the data stream application, and each being associated with a list of nodes at which the corresponding operator is deployable. A first vertex of the application graph corresponds to a first operator and is associated with two or more of the nodes, and is connected to one or more other vertices corresponding to one or more other operators. The one or more processors are further configured to augment the application graph to generate an augmented graph. The augmenting includes replicating the first operator, such that the augmented graph includes a copy of the first operator at each of the two or more nodes associated with the first vertex, and such that the augmented graph includes one or more copies of each of the one or more vertices corresponding to operators. In the augmented graph, each copy of the first operator is interconnected with one or more copies of the one or more other operators. The one or more processors are further configured to deploy the data stream application over the network based on the augmented graph, such that a copy of the first operator is deployed at each of the two or more nodes associated with the first vertex. The one or more processor are further configured to select a route for a data stream through the augmented graph, where the data stream application is configured to process a plurality of data units of the data stream by using the operators along the selected route.

In yet another embodiment, a computer program product for processing a data stream application includes a computer readable storage medium having program instructions embodied therewith. The program instructions are executable by a processor to cause the processor to perform a method. The method includes receiving data representable by a network graph describing a network having two or more nodes. Further according to the method, data may be received representable by an application graph describing a data stream application. The application graph includes one or more vertices, each corresponding to an operator of the data stream application, and each being associated with a list of nodes at which the corresponding operator is deployable. A first vertex of the application graph corresponds to a first operator and is associated with two or more of the nodes, and is connected to one or more other vertices corresponding to one or more other operators. The application graph is augmented to generate an augmented graph. The augmenting includes replicating the first operator, such that the augmented graph includes a copy of the first operator at each of the two or more nodes associated with the first vertex, and such that the augmented graph includes one or more copies of each of the one or more vertices corresponding to operators. In the augmented graph, each copy of the first operator is interconnected with one or more copies of the one or more other operators. The data stream application is deployed over the network based on the augmented graph, such that a copy of the first operator is deployed at each of the two or more nodes associated with the first vertex. A route for a data stream through the augmented graph is selected, where the data stream application is configured to process a plurality of data units of the data stream by using the operators along the selected route.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 5A-5C illustrate construction of a second augmented graph, according to some embodiments of this disclosure;

DETAILED DESCRIPTION

Various embodiments of this disclosure are data stream processing systems that operate in distributed, dynamic networks, and may involve heterogeneous processing and communication resources. Due to changing workloads and dynamic network conditions, such a network environment poses challenges additional to those posed for data stream processing in homogenous datacenters and, further, may require runtime stream optimization mechanisms that cope with heterogeneous resources.

Examples of such a dynamic network include wide area networks, heterogeneous datacenters, wireless cellular networks in or outside the commercial sector, and mobile ad hoc networks in or outside the military sector. In these environments, operators of a stream application may need to be executed at different network locations depending on the network conditions. For example, depending on available resources, which may vary over time, a mobile face recognition application on streaming video may need to run at the mobile device, at a cellular base station, or at a cloud server. In a mobile ad hoc network, node mobility and wireless channel variations can introduce sudden changes in network state that affect execution of data stream processing applications. The optimization mechanisms used in existing data stream processing systems cannot cope with the network variations of dynamic networks. In contrast, embodiments of the present data stream processing systems are enabled to handle dynamic and heterogeneous networks.

Figure 1:
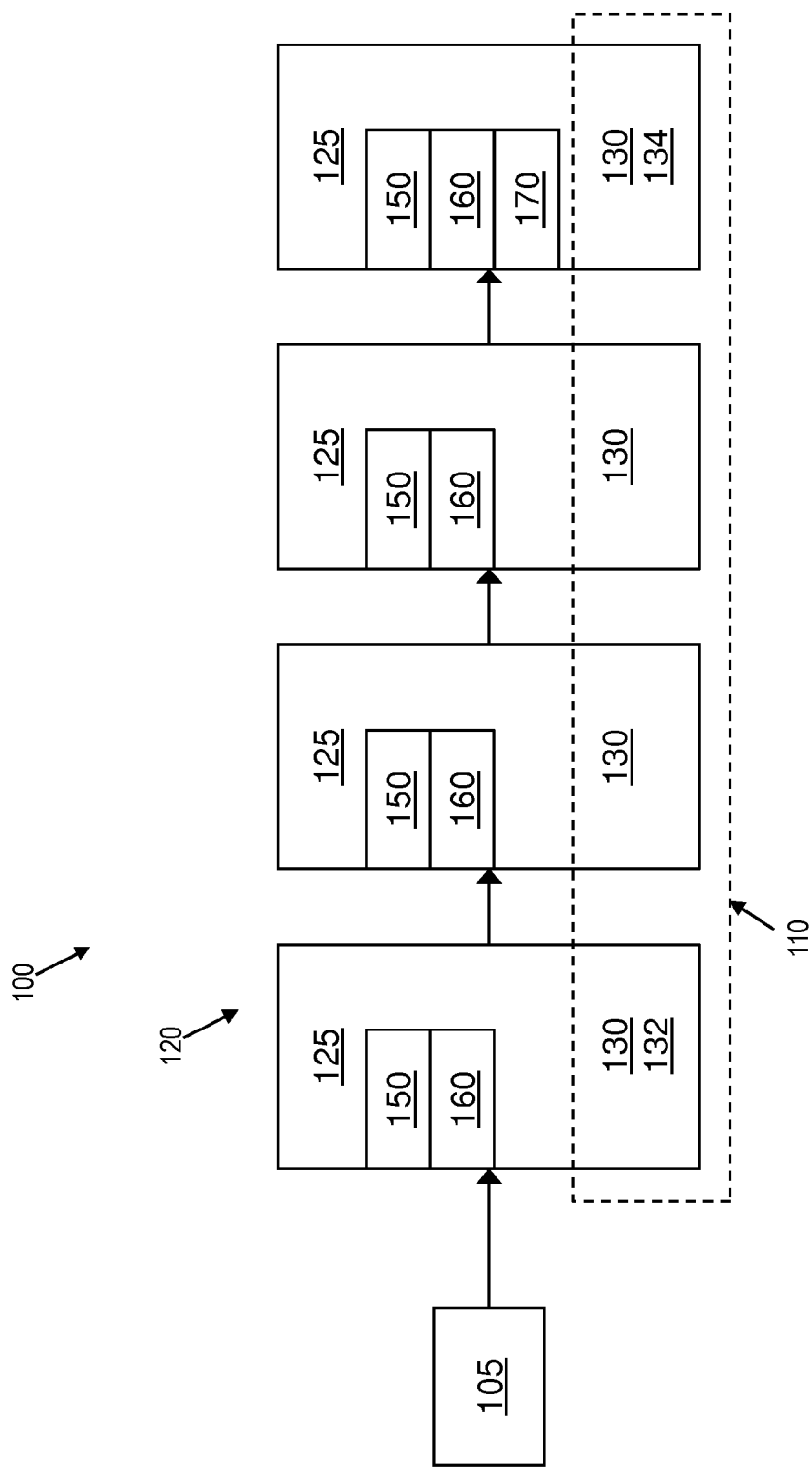
FIG. 1 is a block diagram of a data stream processing system, according to some embodiments of this disclosure.

FIG. 1 is a block diagram of a data stream processing system 100 configured to run in a dynamic network environment, according to some embodiments of this disclosure.

As shown, the data stream processing system 100 may include one or more controller units 105 configured to deploy a data stream application 110 over a network 120 of one or more nodes 125. The controller unit may include hardware, software, or a combination of both. In some embodiments, the controller unit 105 may reside at a centralized server, while in other embodiments, some or all aspects of the controller unit 105 may be distributed throughout the network 120.

In some embodiments, the network 120 may be a dynamic network 120, including heterogeneous nodes 125, and with varying network conditions. Each node 125 may be equipped with processing resources, such as, for example, single-core processors, multi-core processors, or virtual machines. Each node 125 may also include one or more network interfaces, such as various types of wired or wireless interfaces, configured to enable connections between nodes.

The data stream processing system 100 may be configured to receive, such as by through the controller unit 105, information about the network 120 and about a data stream application 110. By way of the controller unit 105 or other mechanism, the data stream processing system 100 may deploy operators 130 of the data stream application 110 over the network nodes 125. To assist in adapting to the dynamic environment of the network 120, also deployed at each node may be a routing unit 150 and a monitoring unit 160 for local management of the application 110. Each of the routing unit 150 and the monitoring unit 160 may include hardware, software, or a combination thereof. In some embodiments, the controller unit 105 or a controller node 125, included among or separate from the set of network nodes 125, may further include or be associated with a routing unit 150 and a monitoring unit 160 for global management of the application 110. Details of these various components will be described later in this disclosure.

Figure 2:
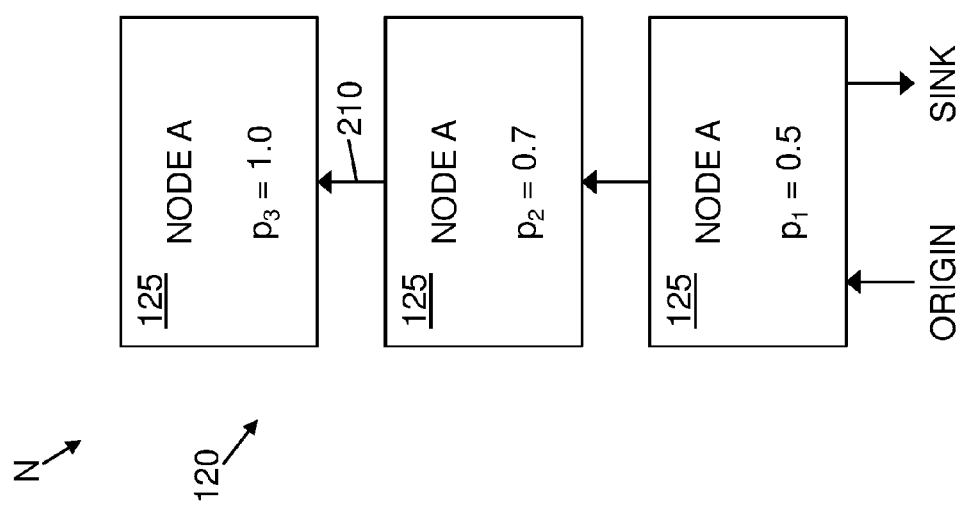
FIG. 2 is an example of a network graph, according to some embodiments of this disclosure.

FIG. 2 is a diagram of an example network graph N, representing a specific network topology of an example network 120 in which a data stream application 110 may be deployed, according to some embodiments of this disclosure. As shown, the network 120 of may include one or more nodes 125. During deployment of a data stream application 110, one or more operators 130 of the application 110 may be deployed across the nodes 125, and may be executable by the processing resources of the nodes 125 at which they are deployed. After deployment, some or all of the nodes 125 in the network 120 may thus be configured to execute aspects of the data stream application 110 through use of the operators 130.

Within a network 120, the nodes 125 may be connected to one another by network connections through their network interfaces. In some embodiments, each network connection may be implemented as a sequence of one or more wired or wireless network links. The edges 210 shown between the nodes 125 in the network graph N of FIG. 2 represent such network connections.

Figure 3:
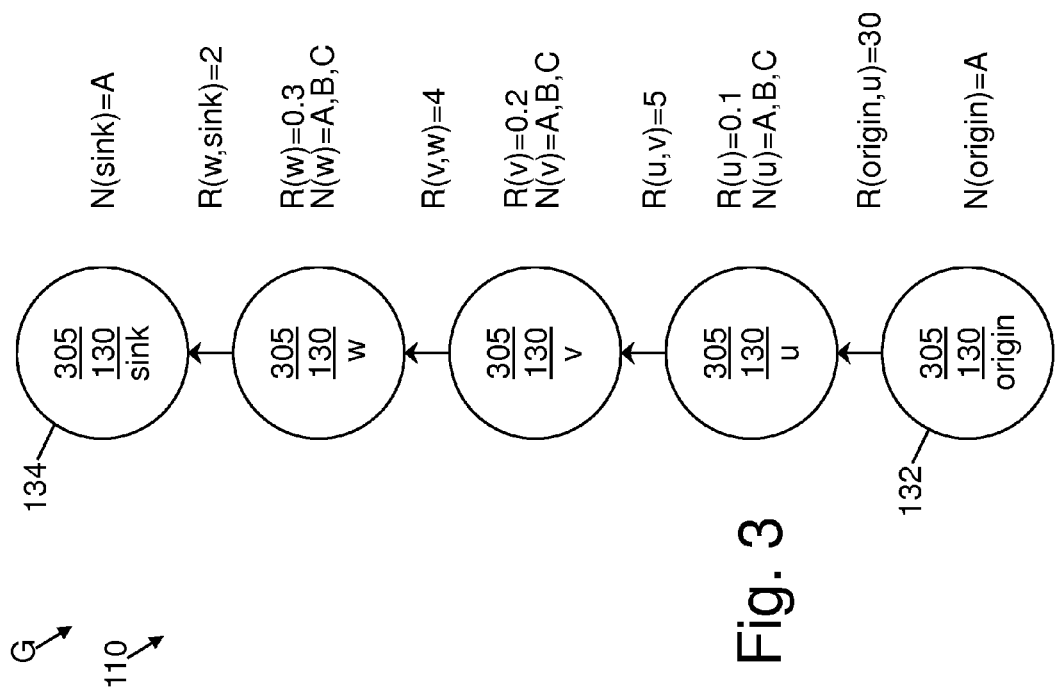
FIG. 3 is an example of an application graph, according to some embodiments of this disclosure.

FIG. 3 is a block diagram of a data stream application 110, as represented by a directed acyclic graph (DAG) G, according to some embodiments of this disclosure. The application graph G describes a sequence of operations performed by operators 130 on a data stream. Each interior vertex 305 of the application graph G may correspond to an operator 130 of the application 110, while each directed edge 310 may represent the transfer of data between operators 130. Each operator 130 may consume the data stream in some manner consistent with the data stream application 110. For instance, an operator 130 may perform some operational aspect of the application 110, and may output data that has been modified by the corresponding operation. One or more origin operators 132 input an original data stream (i.e., an input data stream) into the application 110, while one or more sink operators 134 receive a sink data stream (i.e., an output data stream) after completion of the data stream application 110.

In some embodiments, certain operators 130 may perform tasks other than modifying the data stream. For example, and not by way of limitation, a particular operator 130 may analyze the current state of the data stream, or may simply receive an update as to that current state. Thus, the data output by an operator 130 need not be modified as compared to the data received by that operator 130.

According to some embodiments of the present data stream processing system, a user submits a data stream application request to the data stream processing system 100. The request may include a description of a data stream application 110, representable by an application graph G such as that in FIG. 3, and a description of a network topology, representable by a network graph N such as that in FIG. 2. As will be described in more detail throughout this disclosure, the data stream processing system 100 may deploy the application 110 over the network 120 and may execute the application 110 on one or more data streams.

In some embodiments, the data stream application request may additionally indicate which operators 130 of the application 110 are fixed and which are replicable. Fixed operators 130 are those that may be deployed at a single node 125 of the network 120, which may or may not be a specific node 125. Replicable operators 130 may be deployed at one or multiple nodes 125, which may or may not be specific nodes 125. More specifically, in some embodiments, each vertex 305 of the application graph G, representing an operator 130 of the corresponding application 110, may be associated with a list of one or more specific network nodes 125 at which the associated operator 130 may be deployed. In the case of fixed operators 130, this list may contain an identifier of only a single node 125. In the case of a replicable operator 130, the associated list may include one, two, or more nodes 125, each being capable of executing the tasks of the operator 130.

In some embodiments, if processing or communication requirements for the data stream application 110 are available, the user's request may further include such requirements. More specifically, each vertex 305 may be associated with the processing requirements of its corresponding operator 130. Analogously, each edge 310 of application graph G may be associated with the communication requirements of the application 110. It need not be the case that all or none of the vertices 305 and edges 310 are associated with requirements. Rather, it may be the case that the set of vertices 305 and edges 310 associated with requirements are a proper, non-empty subset of the total set of vertices 305 and edges.

Figure 4:
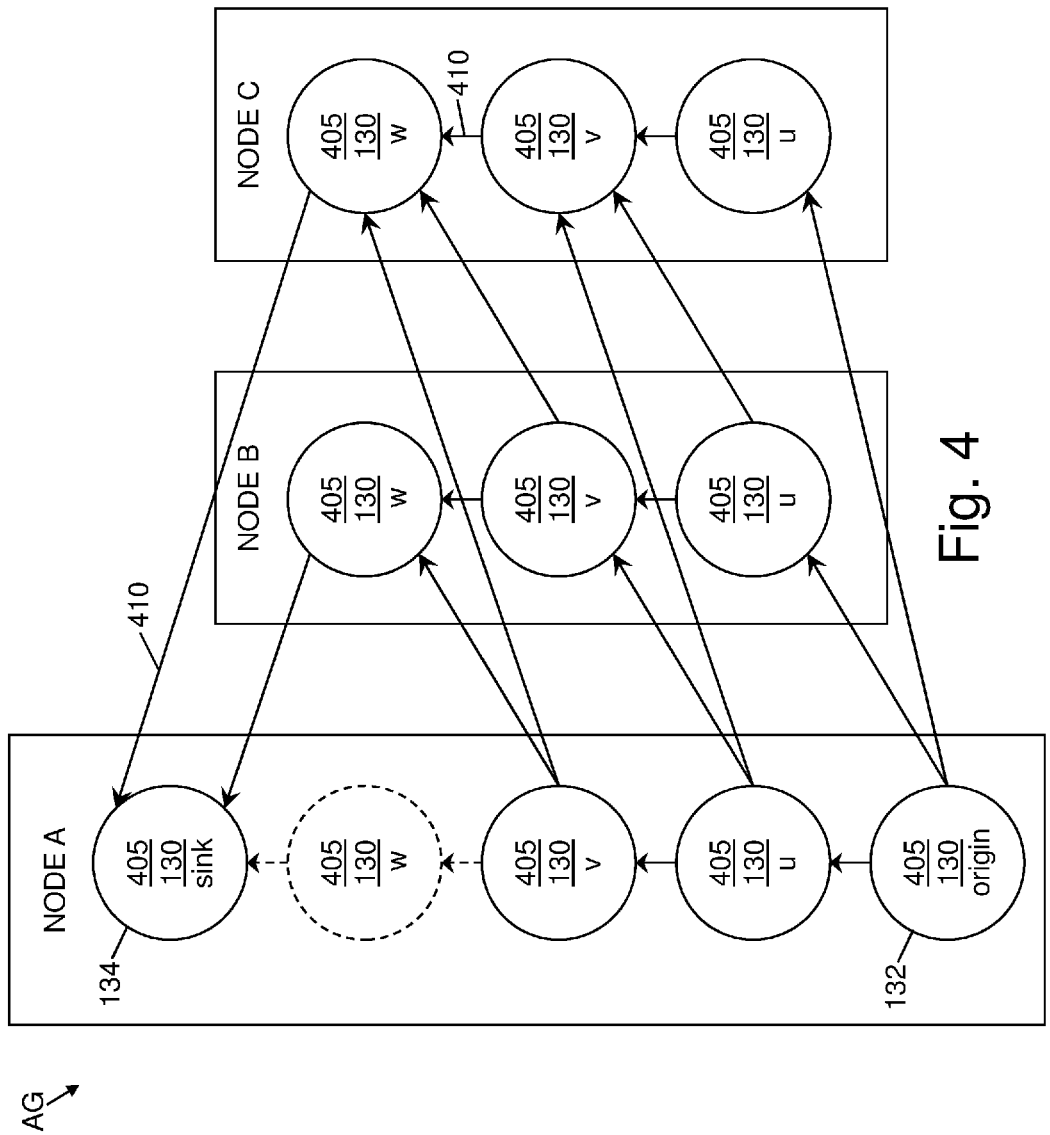
FIG. 4 is an augmented graph based on the network graph of FIG. 2 and the application graph of FIG. 3, according to some embodiments of this disclosure.

Based on the received descriptions of the application 110 and the network 120, the data stream processing system 100 may generate data representable by an augmented graph AG. FIG. 4 depicts an example augmented graph AG that may be produced by the data processing system 100 based on the network graph N of FIG. 2 and the application graph G of FIG. 3, according to some embodiments of this disclosure. More specifically, in this example, the network 120 of FIG. 2 is a hierarchical cellular network, and the application 110 is a mobile streams application. The augmented graph AG may also include the application requirements transferred over from the application graph G, if provided.

The set of vertices 405 of the augmented graph AG may be constructed as follows: For each vertex u in the application graph G, the data stream processing system 100 may construct one or more vertices $u_1 \ldots u_{N(u)}$ in the augmented graph AG, where N(u) is number of nodes 125 associated with vertex u in the description of the application 110. Each of these constructed vertices 405 may be considered copies of the original vertices 305 in the application graph G. Thus, as compared to the application graph G, the augmented graph AG may include one or more copies of each vertex 305 of the application graph G. Thus, although a vertex 305 representing a replicable operator 130 of the application 110 may be associated with multiple nodes 125, each vertex 405 of the augmented graph AG may be associated with only a single node 125 of the network 120, due to the replicable vertices 305 of the application 110 having been replicated and assigned to their respective nodes 135 in the augmented graph AG. However, each node 125 may be associated with multiple vertices 405 in the augmented graph AG, due to the fact that multiple vertices of the application graph G may be associated with the same node 125.

If known, the processing requirements of the application graph G may be transferred over to the augmented graph AG. In this disclosure, R(u) refers to the processing requirements of vertex u (corresponding to a particular operator 130) in the application graph G, which may be transferred over to each vertex $u_n$ in the augmented graph AG. Analogously, if known, communication requirements of the edges 310 of the application graph G may also be transferred to the augmented graph AG. More specifically, in some embodiments, the communication requirement R(u, v) for the edge 310 between vertices u and v of the application graph G may be transferred over to the edges between each $u_n$ and connected $v_n$ in the augmented graph AG.

In the augmented graph AG, multiple vertices 405 may be associated with a single node 125 of the network. In that case, an edge 410 between such vertices 405 may, in some instances, be a local edge 410 contained within the associated node 125. In contrast, a remote edge 410 may span between a first vertex 405 associated with a first node 125 and second vertex 405 associated with a second node 125. Thus, the remote edge 410 may extend between distinct nodes 125 of the network 120. As a practical matter, when a data stream crosses a local edge 410, it may be transmitted from an operator 130 within a first node 125 to another operator 130 within that same node 125. In contrast, when a data stream crosses a remote edge 410, it may be transmitted over a network connection between distinct nodes 125 of the network 120.

Some embodiments of the data stream processing system 100 may prune the initial augmented graph AG to generate a final augmented graph AG. As mentioned above, in some cases, the augmented graph AG may include processing and communication requirements. In such cases, the data processing system 100 may conduct a pruning operation on the augmented graph AG, which may seek to remove edges 410, vertices 405, or both. In the pruning operation, zero or more of the edges 405 and vertices 410 may be removed, thus reducing options for routing data streams through the data stream application 110, and reducing computing times for calculating a current best path for a data stream through the augmented graph AG.

With respect to edge removal, the data stream processing system 100 may remove each remote edge e=(u, v) of the augmented graph AG whose communication requirements C(u, v) exceed the available communication capacity $c_{path}$ of the network path between the network nodes N(u) and N(v) associated with vertices u and v of that edge. With respect to vertex removal, the data stream processing system 100 may remove each vertex u whose individual processing requirement R(u) exceeds the available processing capacity $c_u$ of its associated node 125. Further, when a vertex 405 is removed, all incoming and outgoing edges 410 of that vertex 405 may also be removed.

In another embodiment, however, alternative criteria may be used to determine which vertices 405 are removed. In such an embodiment, the data stream processing system 100 may remove each vertex 405 for which, when the associated processing requirement is combined with the processing requirements of all other vertices 405 associated with the same node 125, those combined processing requirements exceed the capacity of the associated node 125. In that case, various mechanisms may be used to select which of the vertices 405 associated with that node 125 is removed. For example, and not by way of limitation, the data processing system 100 may remove the vertex 405 with the highest processing requirement. For another example, the data stream processing system 100 may remove the vertex 405 positioned farthest along the path of the application 110 (i.e., closest to a sink operator 134 or farthest from a source operator 132).

After the augmented graph AG is generated and, in some embodiments, pruned, the application 110 may be deployed to the network 120 in accordance with the augmented graph AG. In other words, the augmented graph AG may be used as a map when deploying the application 110 to the network 120.

Each vertex 405 of the augmented graph AG may deployed as an operator 130 in its associated network node 125. For each local edge 410 of the augmented graph AG, a local connection between the corresponding operators 130 may be established within the associated node 125 between the operators 130 associated with the vertices 405 adjacent to that local edge 410. For example, and not by way of limitation, such a local connection may be implemented as a high-speed, in-memory connection. For each remote edge 410 of the augmented graph AG, an application layer connection may be established over the network connection between the associated network nodes 125 associated with the vertices 405 adjacent to that remote edge 410. For example, and not by way of limitation, that connection may be implemented as a transmission control protocol (TCP) connection.

Each deployed operator 130 may be in either an active mode or an inactive mode. Active operators 130 may be awake and able to process incoming data units of a data stream. Inactive operators 130 may be suspended for memory saving purposes, and may be unable to process data units of a data stream. In some embodiments, such suspension may be temporary. Additionally, in some embodiments, only replicable operators 130 may be suspendable and capable of becoming inactive.

Each deployed operator 130 may have a routing table, which may be stored locally with the operator 130, that determines the next operator 130 to which its output data stream is to be transmitted. In some embodiments, each routing table may be managed by the routing unit 150 locally at the network node 125 hosting the associated operator 130. Each entry of the routing table may include a possible next operator 130, a sink vertex 405 of the augmented graph AG, the cost to reach the next operator 130, and the cost to reach the sink vertex 405 through this next operator 130. The next operators 130 included in the routing table may include all operators 130, or all active operators 130, to which there exists a direct outgoing edge 410 from the current operator 130. The costs of the entries in the routing table may be initialized based on the measurements of the monitoring unit 160 running at each network node 125. More details of this routing unit 150 and the monitoring unit 160 will be described later in this disclosure.

As mentioned above, in this example, the network 120 of FIG. 2 is a hierarchical cellular network, and the application 110 of FIG. 3 is a mobile streams application with three internal vertices 405 corresponding to interior operators 130, one origin vertex 405 representing am origin operator 132, and one sink vertex 405 representing a sink operator 134. In this example, the processing and communication requirements of the application 110 are known in advance and are annotated on the edges 310 and vertices 305 of the application graph G and, likewise, on the augmented graph AG as well.

The network 120 includes a node A, being a mobile device; a node B, being an edge cellular base station; and a node C, being a cloud server. The processing capacities and network connection capacities between the various nodes 125 are also shown in FIG. 2, and may be among the details initially provided by the user in the request for a data stream application 110. In this example, the origin node 125 (i.e., the originator of a data stream) and the sink node 125 (i.e., the recipient of the data stream after being processed by the application 110) are fixed and deployed at the mobile device that is node A. Such an arrangement may represent a mobile analytics application where the original data streams originate from the mobile device, and the resulting sink data streams are consumed by the mobile device. In this example, all operators 130 with the exceptions of the origin operator 130 and the sink operator 130 are replicable operators 130 and may be associated with any one of the nodes, i.e., the mobile device, the edge cellular base station, and the cloud server.

As shown in FIG. 4, vertex $w_1$ is pruned from the augmented graph AG in this example. The available processing capacity of node A, the mobile device, is $p_1=0.5$, as shown in the network graph of FIG. 2. Thus, that node cannot accommodate the processing requirements of all three operators 130 associated with it. More specifically, $p_1=0.5$ is less than the combined processing requirements of operators u, v, and w, which are $R(u)=0.1$, $R(v)=0.2$, and $R(w)=0.3$. In this example, the data stream processing system 100 removes the vertex 405 and associated operator 130 closest to the sink operator 130 along the data stream application path. When that vertex 405 is removed, all edges 410 adjacent to (i.e., directly to and from) that vertex 405 may also be removed, as shown.

Additionally, in this particular example, there exists no directed edge 410 from operators 130 of network nodes 125 higher in the hierarchy toward operators 130 of network nodes 125 lower in the hierarchy other than to the sink operator 130 (i.e., no edges 410 from the cellular base station of node B to an interior operator 130 of the mobile device, and no edges 410 from the cloud server of node C to an interior operator 130 of the cellular base station or the mobile device). This feature may be particular for the case of hierarchical networks, where it makes sense for the data to move from lower processing resources toward higher processing resources. In some embodiments, the data stream processing system 100 may determine the existence of such a hierarchy based on the processing capacities indicated in the network 120. For instance, in the network graph N of this example, the respective processing capacities of the mobile device (node A), the cellular base station (node B), and the cloud server (node C) are $p_1=0.5$, $p_2=0.7$, and $p_3=1$.

During the stream application execution, the data stream processing system 100 may route one or more data streams along a path through the augmented graph AG from an origin operator 132 at an origin vertex 405 to a sink operator 134 at a sink vertex 405. Such a path may represent the communication and processing actions on the data streams at the nodes 125 hosting the operators 130 along the route. For instance, the route {origin, $u_1$, $v_2$, $w_3$, sink} represents that the mobile device (node A) provides the original data stream and performs an operation corresponding to operator $u_1$. In this example, the mobile device transmits the resulting data stream over a network connection to the cellular base station (node B), where the data stream is processed by operator $v_2$. The cellular base station transmits its output data stream to over network connection to the cloud server (node C), where the data stream is processed by operator $w_3$. The cloud server transmits its resulting data stream to the sink operator 130, which is back at the mobile device.

During the execution of a data stream application 110 on a data stream, the one or more origin operators 130 may send data streams through the application 110. Those data streams may be routed through the augmented graph AG representing the application 110 and the applicable network 120 and may be processed by the operators 130 of the application 110 through such routing. In some embodiments, the data stream processing system 100 may monitor, either continuously or periodically, various key performance indicators (KPIs). Such routing may be performed by the one or more monitoring units 160 associated with the system 100. Based on the monitored KPIs, the data stream processing system 100 may adapt to changes in network conditions or end-to-end application performance by executing an adaptive routing algorithm.

Each network node 125 may monitor a set of key performance indicators (KPIs), which may but need not vary per node 125. At each node, such monitoring may be performed by a local monitoring unit 160. For example, and not by way of limitation, with respect to processing state, the KPIs monitored may include one or more of processing delay, memory delay, and utilization of the processing resources at that node 125. In some embodiments, each node 125 may additionally monitor, as part of its processing state, the states of the operators 130 deployed at that node 125. With respect to the network state, the KPIs monitored may include one or more of capacity, throughput, network delay, and utilization of network links or paths to other network nodes. In some embodiments, each node 125 may additionally monitor, as part of its network state, the states of network connections to and from that node 125. For example, and not by way of limitation, a node 125 that hosts a sink operator 130 may monitor end-to-end application KPIs that captures the outcome of the application 110. Such KPIs may include throughput and delay and, in some embodiments, may be defined in terms of an application-specific utility metric. The information monitored by each node 125 may form that node's local state.

The collective information monitored by the various nodes 125 may form the application's global state, including its network state and its processing state. Depending on whether the data processing system 100 performs centralized, decentralized, or distributed adaptive routing, all three of which will be described below, the application state may be maintained at central network nodes 125 or locally at the nodes 125 where the monitored information is being monitored.

As shown in FIG. 1, some embodiments of the data stream processing system 100 may include one or more routing units 150, configured to execute a routing algorithm to compute a path for a data stream through the application 110, as represented by the augmented graph AG. The routing algorithm may determine to which operator 130 to route the data stream output by each prior operator 130 in the augmented graph AG. As discussed above, a data stream output by an operator 130 may be routed to the next operator 130 of the application 110, which may be local at the same node 125 or may be remote at a different node 125. The routing may end when the data stream, as modified by the various operators 130, reaches a sink operator 130. In some embodiments, the complete route of a data unit of the data stream is determined prior to that data unit leaving the origin operator 130 for processing. In other embodiments, however, each node 125 may update the route, thus causing the complete route of a data unit to be unknown when the routing begins. In either case, the route may be determined dynamically, updateable based in the current application state, such that not all data units need take the same route.

The routing algorithm may be based, at least in part, on the edge costs of the various possible routes through the augmented graph AG. The cost associated with a particular edge 410 may reflect the combined cost of transmitting a data unit of the data stream over the network connection that corresponds to the edge 410 in addition to the cost of processing the data unit at the destination operator 130 adjacent to the edge 410. Thus, the edge cost accounts for both transmission and processing. Each possible route through the augmented graph AG may represent a sequence of a transmission (i.e., to a destination operator 130) and processing (i.e., by that destination operator 130) combination, where the sequence brings a data unit from an origin operator 130 to a sink operator 130. Using the routing algorithm, the data stream processing system 100 may select a "best" or minimum-cost route through the augmented graph AG.

Each network node 125 may calculate the outgoing edge costs of its operators 130, which may be based on the KPIs measured by that node 125. Edge cost may be defined in various ways and may be a function of various monitorable KPIs related to the network or processing performed by the operators 130, such as, for example, delay, throughput, capacity, utilization, congestion indicators (e.g., queue lengths), or a combination thereof.

In some embodiments, an edge's cost from a source operator 130 to a destination operator 130 may be calculated by one or more exponential functions of the utilizations of the edge's network connections and destination operator 130. An exponential cost function has desirable properties, in that it may minimize the resource usage by preventing the data stream application 110 from using a large amount of processing resources and communication resources. Further, with exponential functions, edges 410 may become much less desirable compared to others as their utilization increases by a small amount. This may provide an effective way of performing dynamic load balancing across the various nodes 125 and network connections.

More specifically, in some embodiments, the cost associated with a directed edge e=(u, v) of the augmented graph AG may be defined as follows, accounting for both transmission and processing:
$\text{alpha}^{Lv/Cv-1}$ if e=(u, v) is a local edge, in which case it may be assumed that the communication cost is negligible; and $\text{beta}^{Le/Ce-1}+\text{alpha}^{-Lv/Cv-1}$ if e=(u, v) is a remote edge.

In the above, Lv represents the monitored throughput of the destination operator v, and Cv represents the processing capacity of the node 125 associated with the destination operator v. Thus, Lv/Cv may be the processing utilization of operator v at its associated network node 125. The variable Le represents the measured throughput of the path associated with edge e. The variable Ce represents the communication capacity of the path associated with edge e. Thus, Le/Ce may be the path utilization of edge e. The variables alpha and beta may be system parameters for the bases of the exponents for, respectively, processing and communication resources.

In another example embodiment, the cost of each edge 410 may be defined as the difference between the queue backlog of the edge's source operator 130 and the queue backlog of its destination operator 130, multiplied by the capacity of the network connection that corresponds to the edge 410. This edge cost definition corresponds to a back-pressure algorithm that has been shown to maximize network throughput.

The data stream processing system 100 may compute routes in centralized, decentralized, or distributed mode, depending on the embodiment. Some embodiments may use a combination of these modes. In each mode, each network node 125 may use its monitoring unit 160 to measure its local state. Further, in each mode, the current path by which data units are routed may be updated dynamically to adjust to changing network conditions. However, the mode being used may determine how updated are made.

In centralized mode, a controller node 125 (or in some embodiments, the controller unit 105) may maintain the global state, which may include a representation of the network topology, the stream application 110, and the augmented graph AG. If a controller node 125 is used, it may or may not include operators 130 of the application 110 in addition to acting as the controller. Each other node 125 of the network 120 may send its local state to the controller node 125. The controller node 125 may in turn update the global state. Based on that global state, the control node 125 may compute the current one or more routes to be taken by incoming data units of the data stream, and may disseminate this routing decision to the network nodes 125. In some embodiments, this computation may be performed by the routing unit 150 of the controller node 125. Upon receipt, each network node 125 may update the routing tables of its local operators 130 with the routing decisions. In that way, each node 125 may remain informed as to where to route data units after processing by a local operator 130 at the node 125. After an operator 130 processes a data unit, that operator 130 may consult its routing table to identify a minimum-cost edge along which to transmit its output for further processing.

In decentralized mode, each network node 125 may maintain a copy of the global state. Each node 125 may send its local state to one or more of its neighboring nodes 125 (i.e., the set of nodes 125 that share at least one edge of the augmented application graph AG with the node 125 in question), such that all the local states of the various nodes 125 are shared among the entire set of nodes 125. When receiving updates from other nodes 125, each node 125 may update its copy of the global state and execute a common routing algorithm as a function of the global state, resulting in an updated route for incoming data units. After application of the routing algorithm, each node 125 may update its routing tables to correspond to the updated route. After an operator 130 processes a data unit, that operator 130 may consult its routing table to identify a minimum-cost edge along which to transmit its output for further processing.

In distributed mode, each node 125 may maintain its local state and transmit that state only to its neighboring nodes 125. In this mode, unlike in decentralized mode, the neighboring nodes 125 need not share received local states of other nodes 125. Based on the information from its neighboring nodes 125, each node 125 may compute its edge costs and update the routing tables of its operators 130. After an operator 130 processes a data unit, that operator 130 may consult its routing table to identify a minimum-cost edge along which to transmit its output for further processing.

To route data units according to the current minimum-cost route, each node 125 may consult its operators' forwarding tables. However, routing may be performed at varying data granularities, which also contribute to determining which particular data units follow which paths. For instance, an operator's routing table need not be updated and consulted for every data unit processed. Rather, the amount of data processed between occasional updates to the routing table may vary from one embodiment to the next. Some embodiments of the data processing system 100 may use unit-based routing, where the granularity is based on data units, while some other embodiments may use path-based routing, where the granularity is based on use of full routes. Both of these options are described in more detail below.

In unit-based routing, the routing algorithm may be applied to update the edge costs at each change of the nodes' local states. In other words, the current route may change from one data unit to the next, potentially between every single data unit. This approach provides highly dynamic updates of the routing tables. Various mechanisms may be used for unit-based routing, including minimum-path-cost routing and minimum-edge-cost routing.

In embodiments using minimum-path-cost routing, the routing algorithm may determine a minimum-cost route from each origin operator 130 and from each interior operator 130 to each sink operator 130 in the augmented graph AG. In this case, the route cost may be given by the sum of the costs of its edges 410, and the nodes 125 may maintain and update an estimate of each route cost based on their local states and the known local states of other nodes 125. In centralized and decentralized mode, some embodiments of the data processing system 100 may use Dijkstra's algorithm or a variation of the Bellman-Ford algorithm to compute the minimum-cost route. In distributed mode, each node 125 may use a variation of the distributed Bellman-Ford algorithm to compute the minimum-cost path for each for each of its operators 130 to each sink operator 130 of the augmented graph AG. The variation of the Bellman-Ford algorithm used may optimize route computation by exploiting the DAG structure of augmented graph AG (i.e., exploiting the fact that the augmented graph AG does not contain any cycles). More specifically, the augmented graph AG may be topologically sorted during initial deployment of the application 110. During the execution phase, the minimum-cost computations and neighboring-node local state communications between nodes may follow the topological order of the vertices 405 of the augmented graph AG.

In embodiments using minimum-edge-cost multipath routing, the nodes 125 may execute a dynamic routing algorithm where each data unit may be routed according to the edge 410 that currently incurs the minimum cost. The edge costs may be computed by each network node 125 based on the local state and local states of neighboring nodes 125. A particular example of this is the backpressure algorithm, where the cost of each edge 410 is defined as the difference between the instantaneous queue backlogs of its source operator 130 and destination operator 130, multiplied by the capacity of the network connection that corresponds to the edge 410. Using this algorithm, routing may be performed by sending data units over the minimum-cost edge from each operator 130. Backpressure routing has been shown to maximize network throughput in general networks.

An advantage of unit-based routing is that it can potentially utilize all routes between the origin vertices 405 and the sink vertices 405 in the augmented graph AG, thus providing fine-grained load balancing, fast reaction to network dynamics, and improved application throughput. However, the usage of a high number of routes may incur a computational overhead. For example, if edge cost is defined based on instantaneous queue backlogs, as in the backpressure algorithm, the routing computation may need to be performed for every data unit.

Another disadvantage of using multiple routes arises in data stream applications 110 that need to maintain the sequence of incoming data units. With this in mind, some embodiments of the data processing system 100 may include reordering unit 170 with each sink operator 134. As the number of alternative routes used increases, the time variability of data unit arrivals at each sink operator 134 may increase, thus making the operation of the reordering unit 170 more challenging.

An alternative design to unit-based routing is path-based routing, i.e., operating at the granularity of full routes. With this approach, the data stream processing system 100 may keep a single or a limited number of routes fixed for a longer time period, and may route data units over only these paths during that time period. In an extreme case, only a single route may be used per sink operator 134 at a time (i.e., for each operator in application graph G, there exists only a single active replica operator 130 in the augmented graph AG at a given time). In case multiple routes are used, the data stream processing system may perform load balancing of data units among the paths, which may be performed at the source operators 132 of the application 110 as represented by the augmented graph AG. Path-based routing may be achieved by, when the routing tables are updated, updating the various routing tables to remove or set as inactive edges 410 that are not to be used.

The single-path (limited multi-path) approach may reduce the work needed for reordering data units at each sink operator 134. On the other hand, this option may require mechanisms that either ensure that the units of an existing route have been processed when a new route is selected or ensure that the in-flight data units (i.e., data units already in the midst of being routed through the segmented graph AG) are retransmitted by the source operators 134 along the new route.

In an example implementation of single-path based routing, the data processing system 100 may continuously or periodically measures end-to-end stream application KPIs and may select a new route if those KPIs are deemed unacceptable (e.g., if the delay is too long). The edge costs may be updated, continuously or periodically, based on these KPIs. After the application's performance dips below a predetermined threshold, which may be determined offline by application requirements or computed online by a baseline measure of normal application operation, the data stream processing system 100 may update the current route. In some embodiments, the data stream processing system 100 may perform this update as follows: (1) subtract from the augmented graph AG the measured operator and edge utilizations of the current route; (2) compute a minimum-cost route based on the current state of the augmented graph AG; (3) drain all data units from the current route, e.g., by using a timeout mechanism or by utilizing an explicit acknowledgement to ensure are data units have reached a sink operator 134; (4) deactivate the operators 130 in the current route and activate the operators in the new route, by updating the routing tables accordingly; and (5) send data units over the new route.

The controller unit 105 may be responsible for various management tasks of the data stream processing system 100, including updating the routes used for the data stream. Tasks of the controller unit 105 may include one or more of the following, for example: in some embodiments, where the controller node 125 resides at the controller unit 105, receiving KPI measurements computing route determinations; initiating route computations; and initiating the application of route changes. Decisions made by the controller unit 105 may depend on end-to-end application performance measurements, representing processing and network dynamic. In some embodiments, the controller unit 105 may compute routes either periodically or on demand. In some further embodiments, the controller may switch to a new minimum-cost route when one or more of the following events occur: (1) an end-to-end application KPI at a sink operator 130 dips below a pre-specified threshold; (2) the difference between the cost of the current route and a newly computed route exceeds a threshold; or (c) a failure occurs at an edge 410 or operator 130 of the current route.

In some applications 300, each operator 130 may accept multiple input streams, represented as multiple incoming edges 410 in the application graph G, and multiple output streams, represented as multiple outgoing edges 410 in the application graph G. Due to such multi-input and multi-output operators 130, the data processing system 100 may be configured to handle copying the data stream as needed so that all operators 130 that needs certain data units receive such data units for processing. This will be described further below.

In some embodiments, when an operator 130 has multiple outgoing edges 310 in the original application graph G, meaning distinct destination operators 130 may operate on the output of that operator 130, each possible destination operator 130 adjacent to those edges 310 may receive an output stream from that operator 130. Each of such output streams may be the same.

When an operator 130 has multiple outgoing edges in the original application graph G, copies of each output data unit from the operator 130 may be transmitted simultaneously to all its outgoing edges. Suppose that a replicable operator 130 with k outgoing edges in application graph G has been replicated at n network nodes 125 in the augmented graph AG. For each replica operator 130 at a network node 125, each output data unit may yield k output data unit copies. Each copy may be routed to either the local edge 410 (if one exists) or one of the n or n−1 remote edges 410 in the augmented graph AG. This routing may be implemented in various ways, two options of which are described below.

As a first option, in some embodiments, the copies of each output data unit may be routed to multiple nodes 125. An advantage of this approach is that the routing may be unrestricted because many paths may be utilized. A disadvantage of this approach, however, is that different copies may arrive at their destination operators 130 with different delays, which may be an issue in applications 110 where the data units are required to be in a specific order for later processing. The reordering unit 170 may be used in such cases, and in some embodiments, interior operators 130 other than the sink operators 134 may be associated with reordering units 170 for this purpose.

As a second option, in some other embodiments, all copies of each output data unit may be routed to the same network node 125. This approach may restrict the number of routes that may be considered, but may yield more uniform delays at the sink operators 130. To enforce this more restricted type of routing, all k outgoing edges of a replicated operator 130 that lead to the same node 125 may be assigned the same edge cost.

Figure 5B:
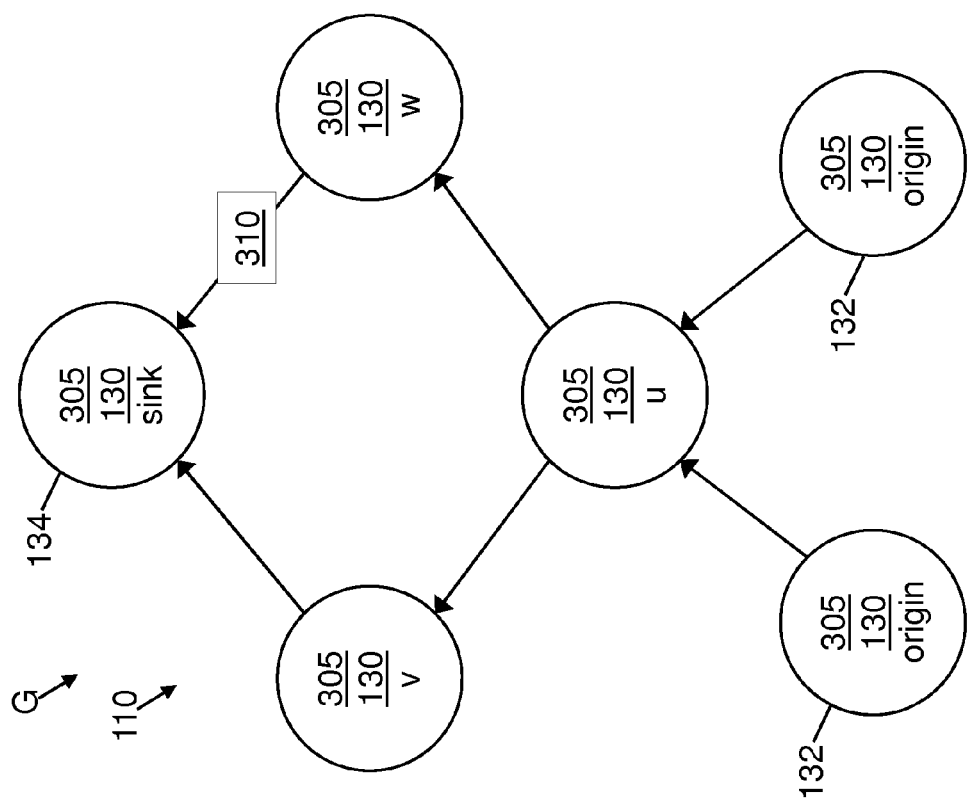
Figure 5C:
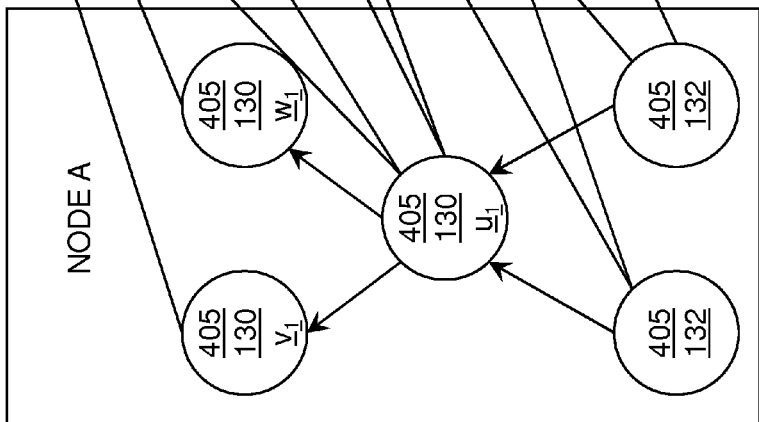

FIGS. 5A-5C illustrate construction of another example augmented graph AG, generated from a network graph N of FIG. 5A and an application graph G of FIG. 5B, according to some embodiments.

In FIG. 5B, operator u has two outgoing edges, (u, v) and (v, w), in the original application graph G. If u were not replicated, each output data unit of u may generate two data unit copies, one of which may be sent to edge (u, v) while the other of which may be sent to edge (u, w). However, as shown in FIG. 5C, operator u is replicated to three network nodes 125 in the augmented graph AG. If replica operator $u_1$ generates an output data unit, that data unit may have two copies. Under the first option above, the data unit copies may be routed independently, i.e., the first copy may be independently routed through $(u_1, v_1)$, $(u_1, v_2)$, or $(u_1, v_3)$, and the second copy may be independently routed to $(u_1, w_1)$, $(u_1, w_2)$, or $(u_1, w_3)$. Under the second option above, the copies output by replica operator $u_1$ may be sent to only a single network node, i.e., either through $(u_1, v_1)$ and $(u_1, w_1)$, through $(u_1, v_2)$ and $(u_1, w_2)$, or through $(u_1, v_3)$ and $(u_1, w_3)$. To enforce this type of routing, the routing costs of all edges 410 leading to the same node 125 may be set equal.

With respect to multiple incoming edges, suppose a destination operator 130 with k incoming edges in the application graph G has been replicated at n network nodes 125 in the augmented graph AG. In this case, the source operator 130 of each incoming edge 410 may have the option of sending data units to the n edges 410 incoming to the n replica operators 130. There may be various ways to perform the routing in this case, depending on the nature of the operator vertex 405. For a first option, in some embodiments, the source operators 130 may route their data units independently to any replica of the destination operator 130. For a second option, in some other embodiments, the source operators 130 may coordinate to route their data units to a single replica of the destination operator 130 at a time. Such routing may be enforced by assigning the same edge cost to all incoming edges 410 of the destination operator 130 at a network node 125. This option may be particularly useful in certain operations, such as database joins, which may not operate properly when data units are split arbitrarily among replicas of the destination operator 130.

In this example, operator u has two incoming edges, $(s_1, u)$ and $(s_2, u)$, in the original application graph G of FIG. 5B. In FIG. 5C, operator u is replicated to three network nodes 125 of the augmented graph AG. Thus, each source operator 130 with an edge adjacent to u as a destination operator 130 may have the option of routing its output data units either locally through replica operator $u_1$ or remotely through replica operators $u_2$ and $u_3$. Under the first option, each source operator 130 may route its output data units independently to the three replica operators 130. For example, and not by way of limitation, source operator $s_1$ may route its output data units to replica operator $u_1$, while source operator $s_2$ routes its output data units to replicated operator $u_2$. Under the second option, source operators $s_1$ and $s_2$ may coordinate to send their data units to either of $u_1$, $u_2$, or $u_3$. This constraint may be enforced if the edge costs are such that $(s_1, u_1)=(s_2, u_1)$, $(s_1, u_2)=(s_2, u_2)$, $(s_1, u_3)=(s_2, u_3)$. In the example of FIGS. 5A-5C, it can be seen that the edge costs meet this condition because these three edge pairs share the same physical network connections and replica operators 130.

Figure 6:
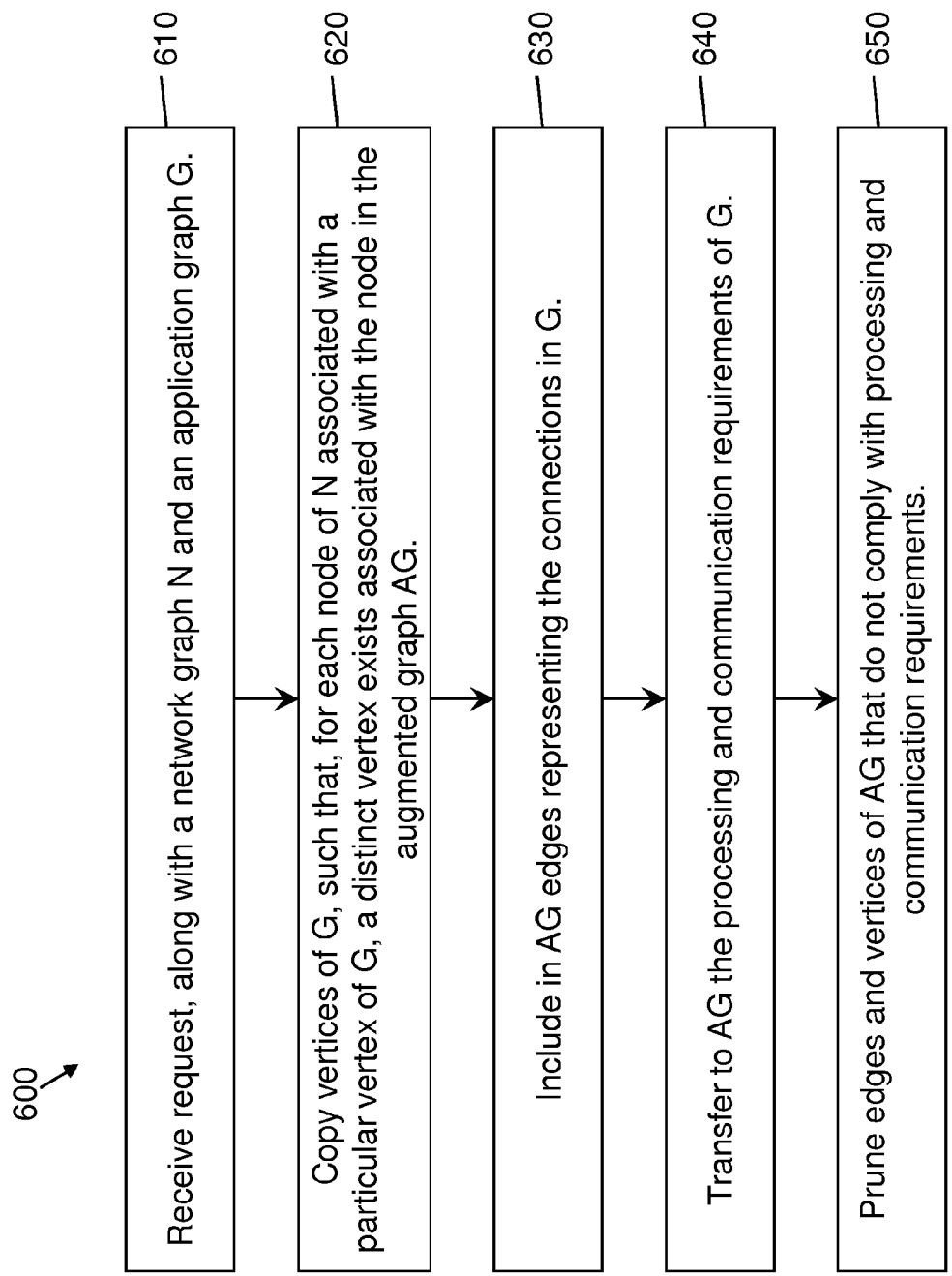
FIG. 6 is a flow diagram of a method for generating an augmented graph, according to some embodiments of this disclosure.

As discussed above, the data stream processing system 100 may use two major phases, a deployment phase followed by an execution phase. In the deployment phase, the data stream processing system 100 may generate an augmented graph AG and deploy the application 110 over the augmented graph 110. In the execution phase, the data stream processing system 100 may execute the application 110 by routing data units of one or more data streams through dynamically selected minimum-cost routes. FIG. 6 illustrates aspects of the deployment phase, while FIGS. 7-9 illustrate aspects of the execution phase.

FIG. 6 is a flow diagram of a method 600 for generating an augmented graph AG, according to some embodiments of this disclosure. As shown, at block 610, a request may be received, including data representing a network graph N and an application graph G. At block 620, the vertices 305 of the application graph G may be copied such that, for each node 120 associated with a particular vertex 305 in the application graph G, a distinct vertex 405 exists associated with the node in the augmented graph AG. At block 630, edges 410 may be included in the augmented graph AG representing connections between the vertices 305 in the application graph G. At block 640, processing and communication requirements may be transferred from the application graph G to the augmented graph AG. At block 650, vertices 405 and edges 410 not complying with such requirements may be pruned form the augmented graph AG.

Figure 7:
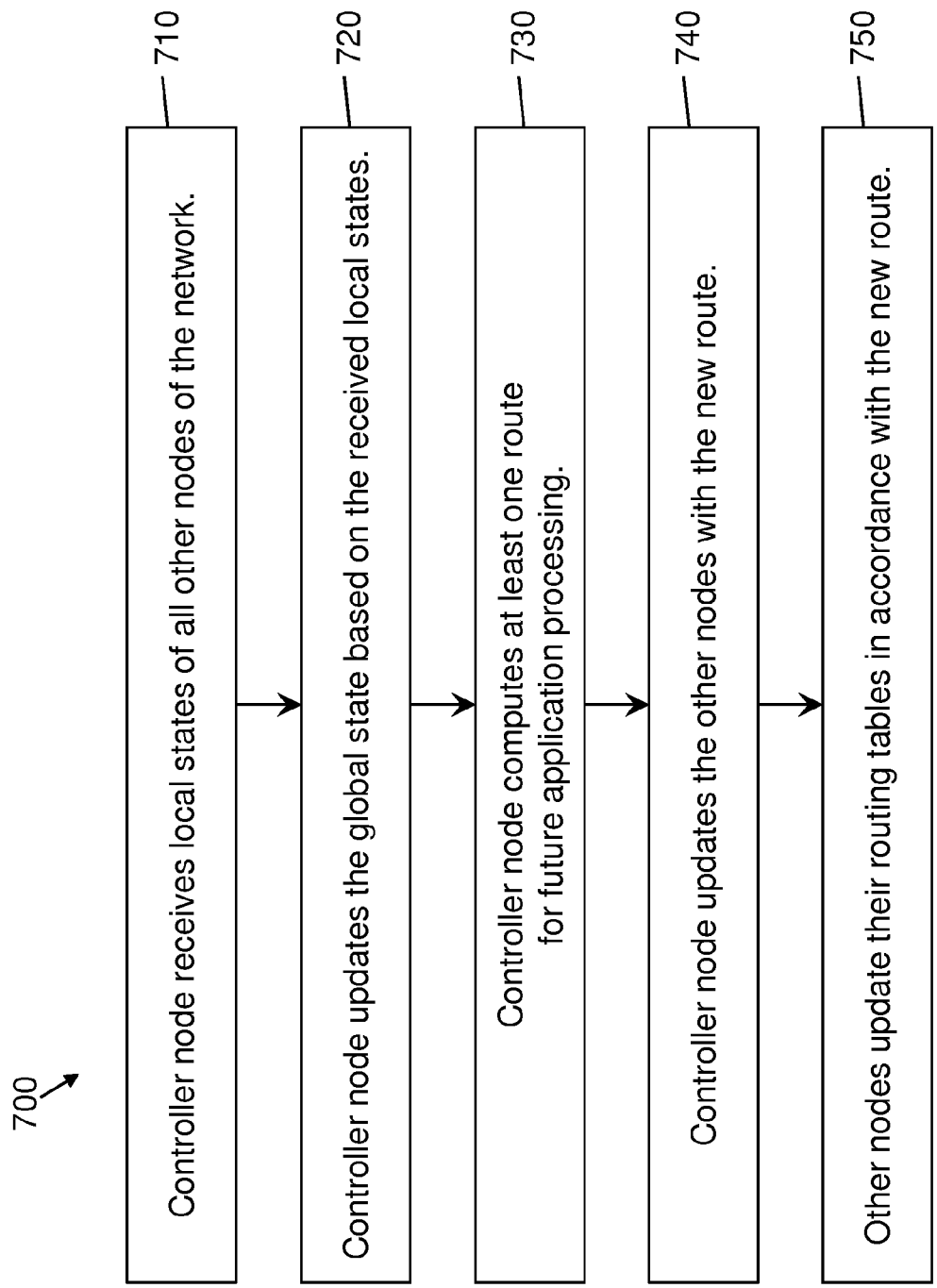
FIG. 7 is a flow diagram of a method for executing a data stream application based on an augmented graph, in centralized mode, according to some embodiments of this disclosure.

FIG. 7 is a flow diagram of a method 700 for executing a data stream application based on an augmented graph AG, in centralized mode, according to some embodiments of this disclosure. As shown, at block 710, a controller node receives the local states of the various other nodes 120 in the network 120 of the data stream application 110. At block 720, the controller node 125 may update the global state of the application 110 based on the received local states. At block 730, the controller node 125 may compute at least one route for future data units to use when being processed by the application 110. At block 740, the controller node 125 may update the other nodes with the new route. At block 750, the other nodes may update their routing tables based on the new route. It will be understood that, during the course of this method 700, data units of a data stream may continuously be processed through the nodes 125 of the network 120 in accordance with the current route, which may be updated by this method 700.

Figure 8:
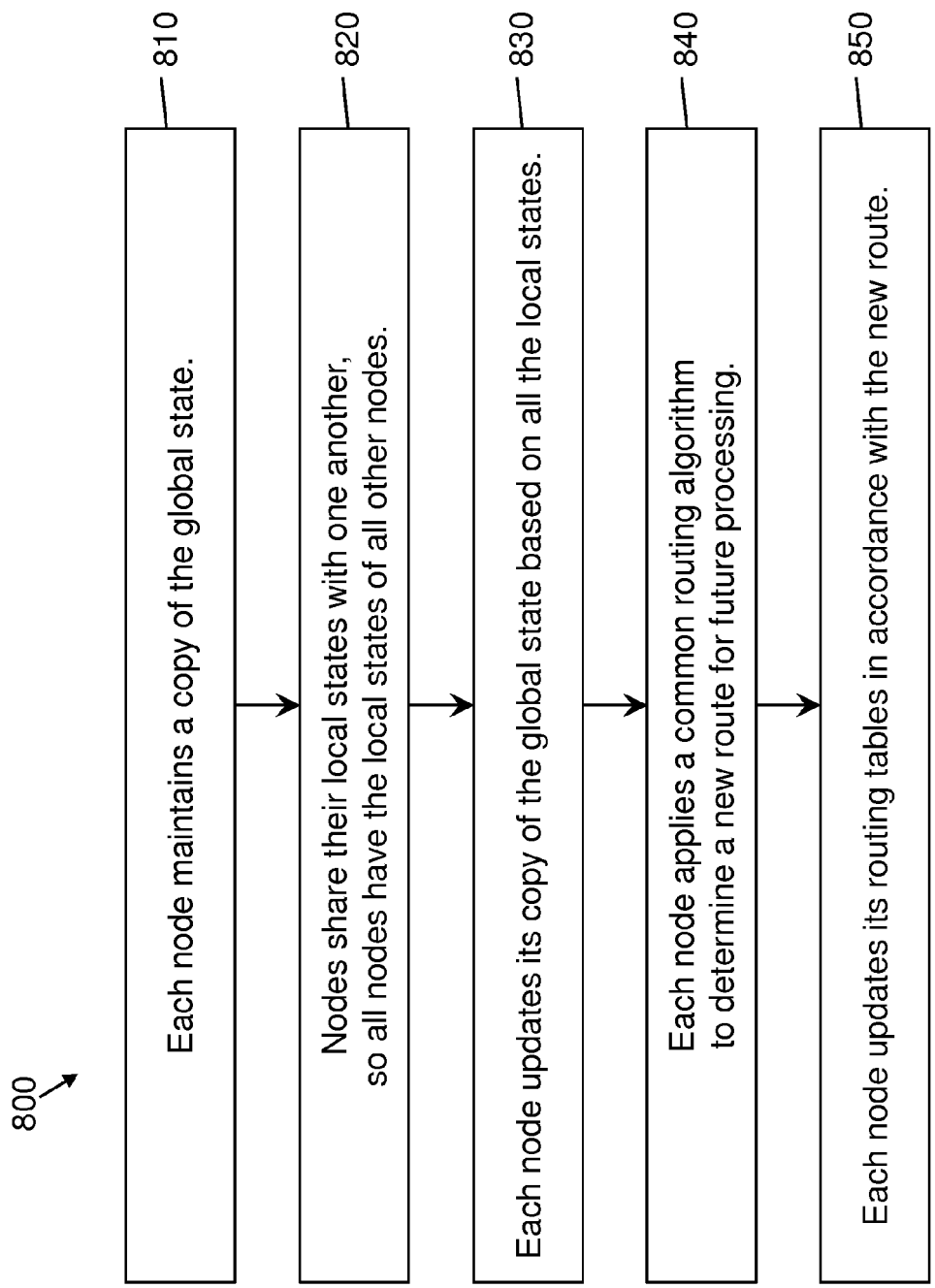
FIG. 8 is a flow diagram of a method for executing a data stream application based on an augmented graph, in decentralized mode, according to some embodiments of this disclosure.
Figure 9:
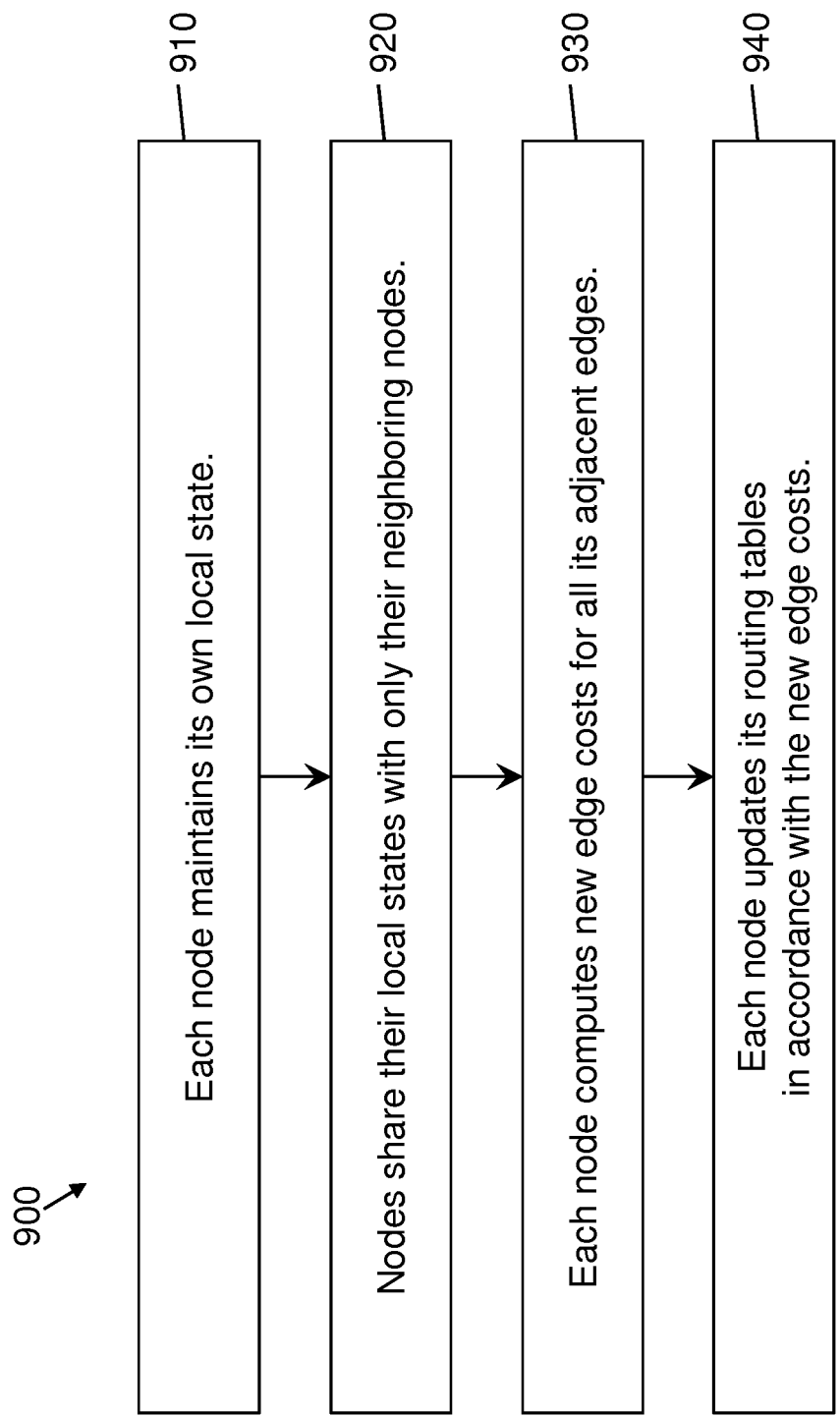
FIG. 9 is a flow diagram of a method for executing a data stream application based on an augmented graph, in distributed mode, according to some embodiments of this disclosure.

FIG. 8 is a flow diagram of a method 800 for executing a data stream application based on an augmented graph AG, in decentralized mode, according to some embodiments of this disclosure. As shown, at block 810, each node 125 of the network 120 may maintain a copy of the data stream application's global state. At block 820, the various nodes 125 may share their local states with all other nodes 125 of the network 120. At block 830, each node 125 may update its copy of the global state based on the local states of the other nodes 125. At block 840, each node 125 may apply a common routing algorithm to determine a new route for future data units of the data stream. At block 850, each node may update its routing table based on the new route. It will be understood that, during the course of this method 800, data units of a data stream may continuously be processed through the nodes 125 of the network 120 in accordance with the current route, which may be updated by this method 800.

FIG. 9 is a flow diagram of a method 900 for executing a data stream application based on an augmented graph AG, in distributed mode, according to some embodiments of this disclosure. As shown, at block 910, each node 125 of the network 120 may maintain its own local state. At block 920, the various nodes 125 may share their local states with their neighboring nodes 125. At block 930, each node 125 may compute the edge costs of all edges 410 outgoing from that node 125. At block 940, each node 125 may update its routing table with the new edge costs. It will be understood that, during the course of this method 900, data units of a data stream may continuously be processed through the nodes 125 of the network 120 in accordance with the current route, which may be updated by this method 900.

Thus, as described in detail above, various embodiments of the data stream processing system 100 may advance the state of the art by introducing techniques for adaptive execution of data stream processing applications 110 in a dynamic and heterogeneous network environments. Some embodiments have the following benefits over existing systems: they have the potential for centralized, decentralized, and distributed operation with adaptivity; they account for both heterogeneous communication and heterogeneous computation resources in a network 120; they incorporate, but do not require, a priori knowledge of data stream application requirements; they enable a flexible and unified treatment of network and load dynamics and allow adaptation based on various objectives, such as throughput, delay, load balancing, and failure recovery; and they do not incur operator migration cost as dynamic placement techniques.

Figure 10:
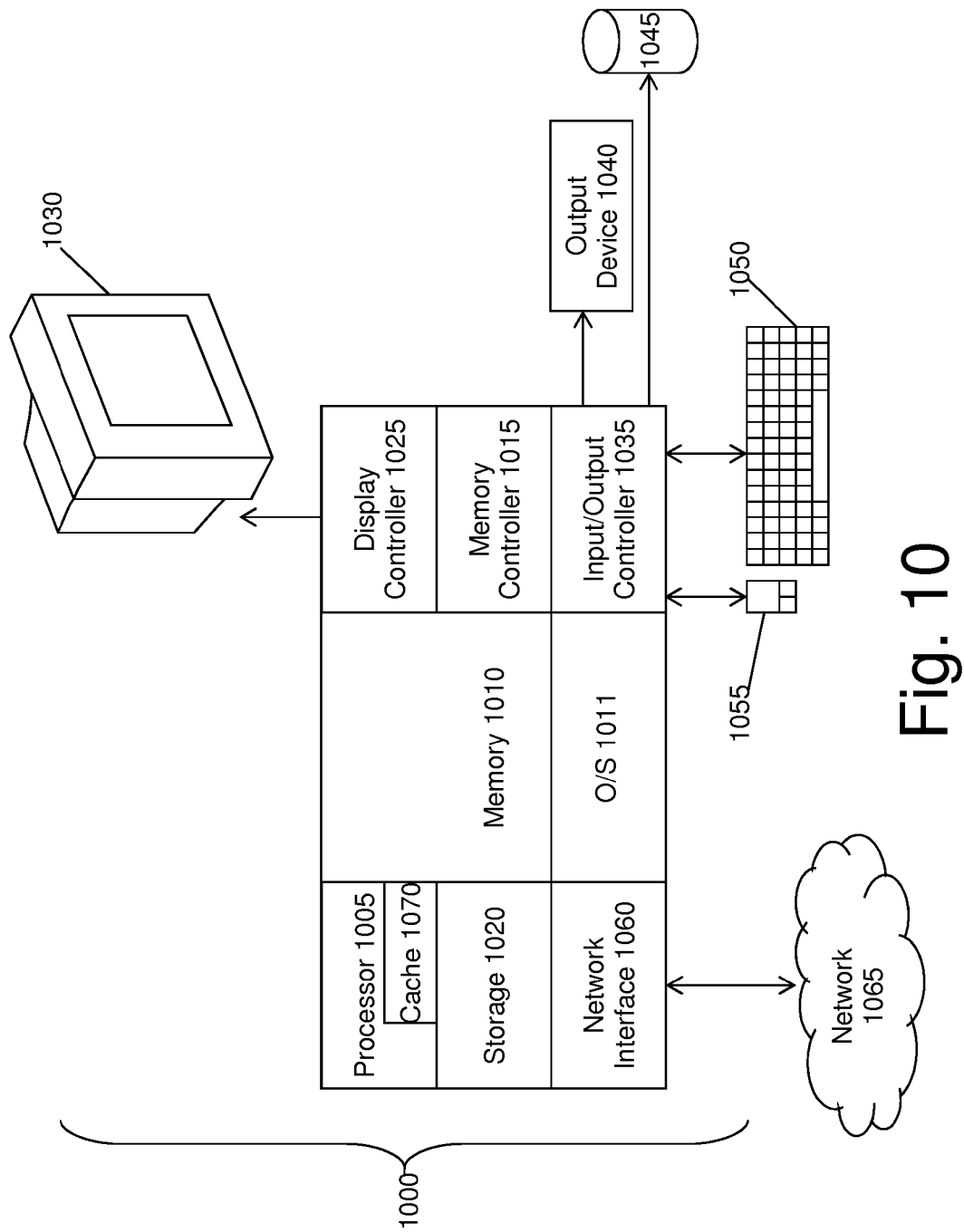
FIG. 10 is a block diagram of a computing device for implementing some or all aspects of the data stream processing system, according to some embodiments of this disclosure.

FIG. 10 illustrates a block diagram of a computer system 1000 for use in implementing a data stream processing system or method according to some embodiments. For instance, such a computer system 1000 could act as a node 125 in the data stream processing system. The data stream processing systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 1000, such as a personal computer, workstation, minicomputer, or mainframe computer.

In an exemplary embodiment, as shown in FIG. 10, the computer system 1000 includes a processor 1005, memory 1010 coupled to a memory controller 1015, and one or more input devices 1045 and/or output devices 1040, such as peripherals, that are communicatively coupled via a local I/O controller 1035. These devices 1040 and 1045 may include, for example, a printer, a scanner, a microphone, and the like. A conventional keyboard 1050 and mouse 1055 may be coupled to the I/O controller 1035. The I/O controller 1035 may be, for example, one or more buses or other wired or wireless connections, as are known in the art. The I/O controller 1035 may have additional elements, which are omitted for simplicity, such as controllers, buffers (caches), drivers, repeaters, and receivers, to enable communications.

The I/O devices 1040, 1045 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1005 is a hardware device for executing hardware instructions or software, particularly those stored in memory 1010. The processor 1005 may be any custom made or commercially available processor, a central processing unit (CPU), an auxiliary processor among several processors associated with the computer system 1000, a semiconductor based microprocessor (in the form of a microchip or chip set), a macroprocessor, or other device for executing instructions. The processor 1005 includes a cache 1070, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 1070 may be organized as a hierarchy of more cache levels (L1, L2, etc.).

The memory 1010 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1010 may incorporate electronic, magnetic, optical, or other types of storage media. Note that the memory 1010 may have a distributed architecture, where various components are situated remote from one another but may be accessed by the processor 1005.

The instructions in memory 1010 may include one or more separate programs, each of which comprises an ordered listing of executable instructions for implementing logical functions. In the example of FIG. 10, the instructions in the memory 1010 include a suitable operating system (OS) 1011. The operating system 1011 essentially may control the execution of other computer programs and provides scheduling, input-output control, file and data management, memory management, and communication control and related services.

Additional data, including, for example, instructions for the processor 1005 or other retrievable information, may be stored in storage 1020, which may be a storage device such as a hard disk drive or solid state drive. The stored instructions in memory 1010 or in storage 1020 may include those enabling the processor to execute one or more aspects of the data stream processing systems and methods of this disclosure.

The computer system 1000 may further include a display controller 1025 coupled to a display 1030. In an exemplary embodiment, the computer system 1000 may further include a network interface 1060 for coupling to a network 1020. The network 1020 may be an IP-based network for communication between the computer system 1000 and any external server, client and the like via a broadband connection. The network 1020 transmits and receives data between the computer system 1000 and external systems. In an exemplary embodiment, the network 1020 may be a managed IP network administered by a service provider. The network 1020 may be implemented in a wireless fashion, e.g., using wireless protocols and technologies, such as WiFi, WiMax, etc. The network 1020 may also be a packet-switched network such as a local area network, wide area network, metropolitan area network, the Internet, or other similar type of network environment. The network 1020 may be a fixed wireless network, a wireless local area network (LAN), a wireless wide area network (WAN) a personal area network (PAN), a virtual private network (VPN), intranet or other suitable network system and may include equipment for receiving and transmitting signals.

Data stream processing systems and methods according to this disclosure may be embodied, in whole or in part, in computer program products or in computer systems 1000, such as that illustrated in FIG. 10.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory; and
one or more processors, communicatively coupled to the memory, the one or more processors configured to:
receive data representable by a network graph describing a network comprising a plurality of nodes;
receive data representable by an application graph describing a data stream application, wherein the application graph comprises one or more vertices, each corresponding to an operator of the data stream application and each being associated with a list of nodes at which the corresponding operator is deployable, and wherein a first vertex of the application graph corresponds to a first operator and is associated with a first subset of nodes comprising two or more nodes of the plurality of nodes and is connected to one or more other vertices corresponding to one or more other operators;
augment the application graph to generate an augmented graph, wherein the augmenting comprises:
constructing, for each vertex corresponding to a respective operator in the application graph, one or more copied vertices in the augmented graph, wherein a count of copied vertices constructed in the augmented graph for a respective vertex in the application graph is equal to a count of nodes associated with the vertex;
wherein the constructing comprises constructing for the first vertex, of the application graph, one or more copied first vertices in the augmented graph, wherein a count of the copied first vertices in the augmented graph for the first vertex is equal to a count of nodes in the first subset of nodes;
replicating the first operator corresponding to the first vertex to provide a copy of the first operator at each of the two or more nodes in the first subset of nodes at which the first operator is deployable; and
connecting, in the augmented graph, each copy of the first operator in each of the two or more nodes in the first subset of nodes with one or more copies of the one or more other operators corresponding to the one or more other vertices connected to the first vertex in the application graph;
deploy the data stream application over the network based on the augmented graph, wherein a copy of the first operator is deployed at each of the two or more nodes in the first subset of nodes associated with the first vertex; and
select a route for a data stream through the augmented graph, wherein the data stream application is configured to transmit and process a plurality of data units of the data stream by using the operators along the selected route.

2. The system of claim 1, the one or more processors being further configured to dynamically update the route based on a global state of the data stream application, and to perform the dynamic updating by selecting, at each of the plurality of nodes, one or more lowest cost edges along which to transmit the data stream.

3. The system of claim 1, the one or more processors being further configured to:
dynamically update a topology of the augmented graph based on a global state of the data stream application, wherein the dynamic updating comprises at least one of: adding edges to the augmented graph, deleting edges from the augmented graph, adding vertices to the augmented graph, and deleting vertices from the augmented graph; and modify operators of the application data stream deployed at each of the plurality of nodes, based on the dynamic updating.

4. The system of claim 1, wherein the one or more processors are further configured to:
receive requirements for the application graph, comprising at least one of processing requirements and communication requirements; and
based on the received requirements and based on resources available at the plurality of nodes of the network, remove at least one of a subset of the one or more copies of the one or more vertices in the augmented graph and a subset of edges in the augmented graph.

5. The system of claim 4, wherein the one or more processors are further configured to:
receive, at a controller node, a set of local states comprising the local states of the plurality of nodes of the network;
update a global state of the data stream application based on the received local states;
modify the route based on the updated global state; and
communicate to the plurality of nodes the modified route.

6. The system of claim 4, wherein the one or more processors are further configured to:
maintain, at each of the plurality of nodes of the network, a local copy of a global state of the data stream application;
share among the plurality of nodes the local states of the plurality of nodes;
modify, at each of the plurality of nodes, the route based on the updated global state; and
communicate to the plurality of nodes the modified route.

7. The system of claim 4, wherein the one or more processors are further configured to:
maintain, at each of the plurality of nodes of the network, a local state of the application, wherein the local state of a first node of the network differs from a local state of a second node of the network;
receive, at each of the plurality of nodes, from one or more neighboring nodes, a local state of each of the one or more neighboring nodes;
modify, at each of the plurality of nodes, a local routing table comprising edge costs of each adjacent edge, wherein the modification is based on the shared local state received from the neighboring nodes; and
wherein dynamically updating the route based on a global state of the data stream application comprises selecting, at each of the plurality of nodes, one or more lowest cost edges along which to transmit the data stream.

8. A computer program product for processing a data stream application, the computer program product comprising a non-transitory computer readable storage medium having program instructions embodied therewith, the program instructions executable by a processor to cause the processor to perform a method comprising:
receiving data representable by a network graph describing a network comprising a plurality of nodes;
receiving data representable by an application graph describing a data stream application, wherein the application graph comprises one or more vertices, each corresponding to an operator of the data stream application and each being associated with a list of nodes at which the corresponding operator is deployable, and wherein a first vertex of the application graph corresponds to a first operator and is associated with a first subset of nodes comprising two or more nodes of the plurality of nodes and is connected to one or more other vertices corresponding to one or more other operators;
augmenting the application graph to generate an augmented graph, wherein the augmenting comprises:
constructing, for each vertex corresponding to a respective operator in the application graph, one or more copied vertices in the augmented graph, wherein a count of copied vertices constructed in the augmented graph for a respective vertex in the application graph is equal to a count of nodes associated with the vertex;
wherein the constructing comprises constructing for the first vertex, of the application graph, one or more copied first vertices in the augmented graph, wherein a count of the copied first vertices in the augmented graph for the first vertex is equal to a count of nodes in the first subset of nodes;
replicating the first operator corresponding to the first vertex to provide a copy of the first operator at each of the two or more nodes in the first subset of nodes at which the first operator is deployable; and
connecting, in the augmented graph, each copy of the first operator in each of the two or more nodes in the first subset of nodes with one or more copies of the one or more other operators corresponding to the one or more other vertices connected to the first vertex in the application graph;
deploying the data stream application over the network based on the augmented graph, wherein a copy of the first operator is deployed at each of the two or more nodes in the first subset of nodes associated with the first vertex and
selecting a route for a data stream through the augmented graph, wherein the data stream application is configured to transmit and process a plurality of data units of the data stream by using y the operators along the selected route.

9. The computer program product of claim 8, the method further comprising dynamically updating the route based on a global state.

10. The computer program product of claim 8, the method further comprising:
receiving requirements for the application graph, comprising at least one of processing requirements and communication requirements; and
based on the received requirements and based on resources available at the plurality of nodes of the network, removing at least one of a subset of the one or more copies of the one or more vertices in the augmented graph and a subset of edges in the augmented graph.

11. The computer program product of claim 10, the method further comprising:
receiving, at a controller node, a set of local states comprising the local states of the plurality of nodes of the network;
updating a global state of the data stream application based on the received local states;
modifying the route based on the updated global state; and
communicating to the plurality of nodes the modified route.

12. The computer program product of claim 10, the method further comprising:
maintaining, at each of the plurality of nodes of the network, a local copy of a global state of the data stream application;

sharing among the plurality of nodes the local states of the plurality of nodes;

modifying, at each of the plurality of nodes, the route based on the updated global state; and communicating to the plurality of nodes the modified route.

13. The computer program product of claim 10, the method further comprising:

maintaining, at each of the plurality of nodes of the network, a local state of the application, wherein the local state of a first node of the network differs from a local state of a second node of the network;

receiving, at each of the plurality of nodes, from one or more neighboring nodes, a local state of each of the one or more neighboring nodes;

modifying, at each of the plurality of nodes, a local routing table comprising edge costs of each adjacent edge, wherein the modification is based on the shared local state received from the neighboring nodes; and wherein dynamically updating the route based on a global state of the data stream application comprises selecting, at each of the plurality of nodes, one or more lowest cost edges along which to transmit the data stream.

* * * * *